Figure 1:
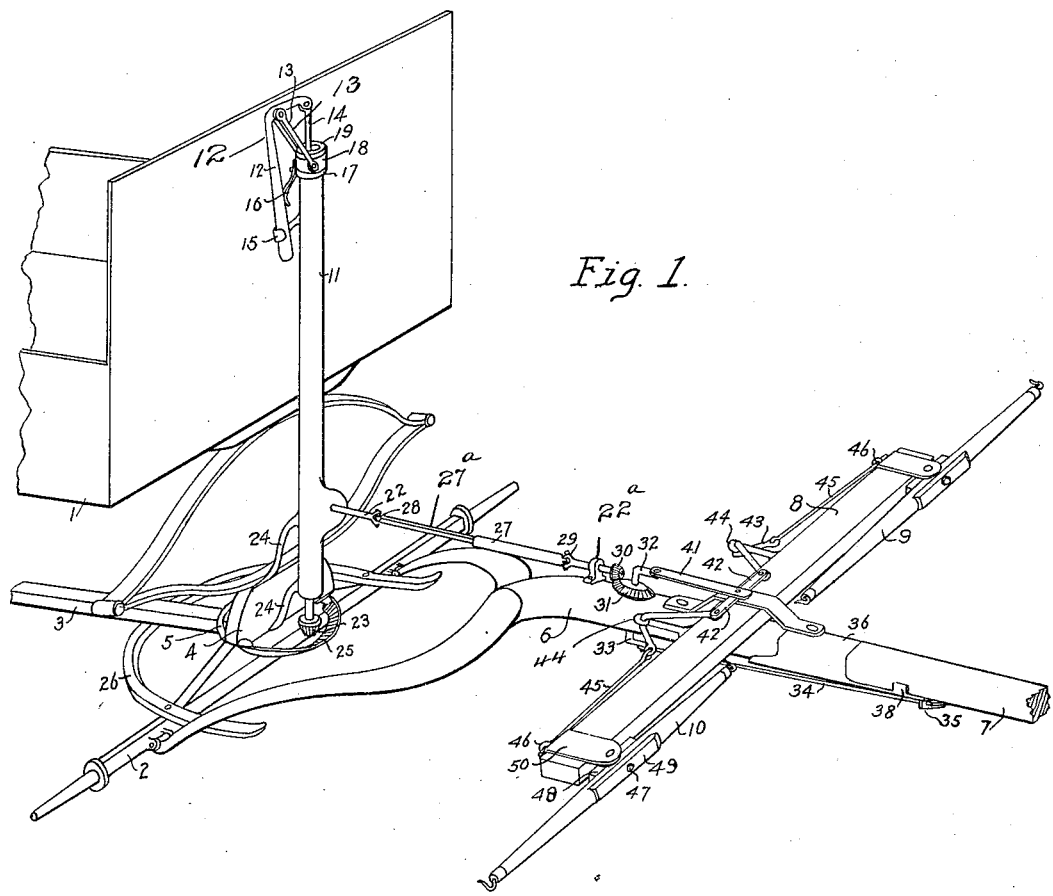

No. 807,368. PATENTED DEC. 12, 1905.
C. E. EPPLER.
HORSE DETACHER.
APPLICATION FILED FEB. 1, 1905.

2 SHEETS—SHEET 1.

WITNESSES:
J. M. Fowler Jr.
Edwin E. Crooman.

INVENTOR.
Charles E. Eppler,
BY Mason, Fenwick & Lawrence,
his ATTORNEYS.

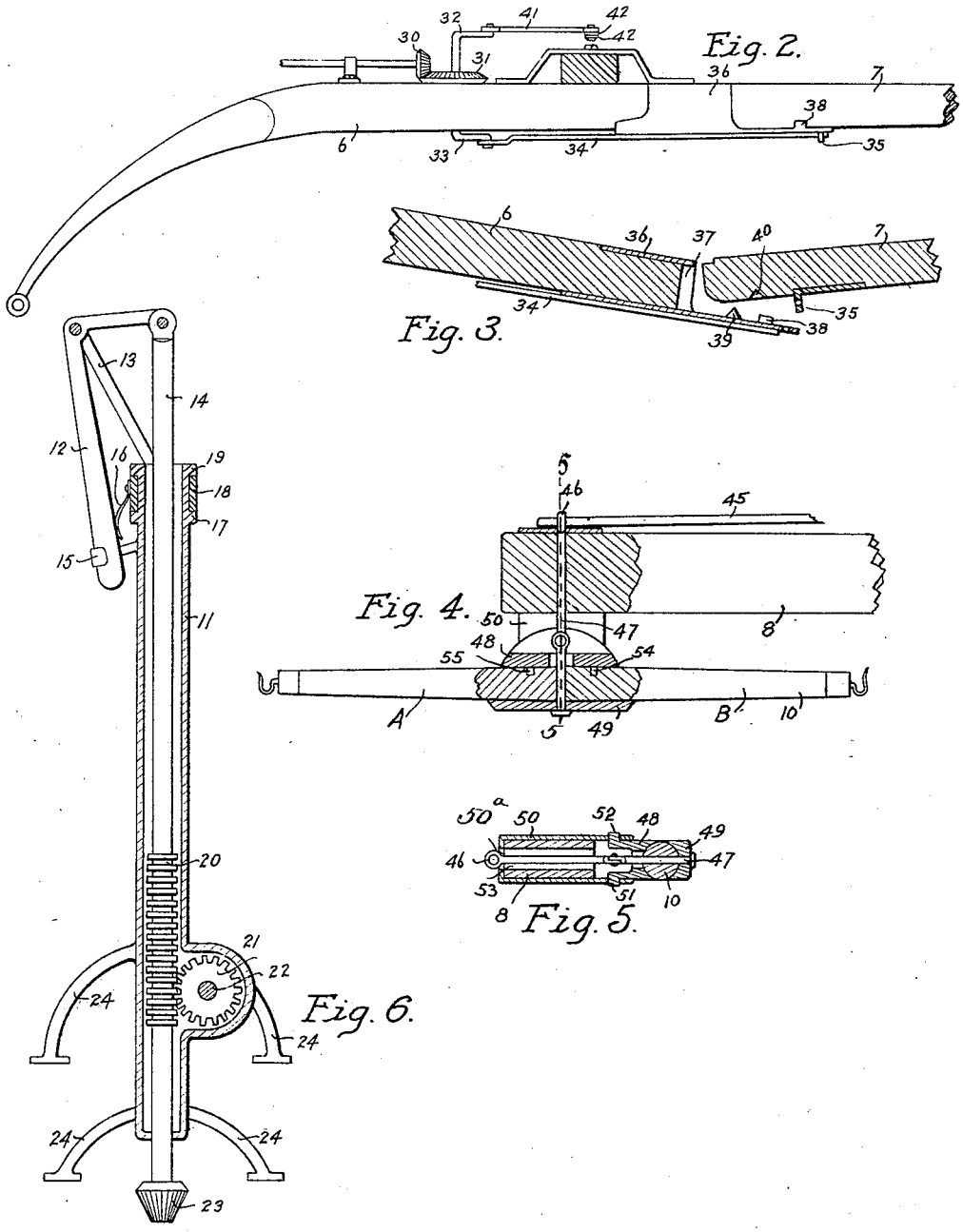

UNITED STATES PATENT OFFICE.

CHARLES E. EPPLER, OF NEAR RAMAH, COLORADO.

HORSE-DETACHER.

No. 807,368.　　　Specification of Letters Patent.　　　Patented Dec. 12, 1905.

Application filed February 1, 1905. Serial No. 243,736.

*To all whom it may concern:*

Be it known that I, CHARLES E. EPPLER, a citizen of the United States, residing in the county of Elbert, near Ramah, El Paso county, State of Colorado, have invented certain new and useful Improvements in Horse-Detachers; and I do hereby declare the following to be a full, clear, and exact description of the invention, such as will enable others skilled in the art to which it appertains to make and use the same.

This invention relates to certain new and useful improvements in horse-detachers.

One of the objects of the invention is the provision of means for detaching a portion of a tongue secured to a vehicle as well as permitting the animal connected to the tongue to be detached therefrom at the same time.

Another object of the invention is the provision of means for detaching an animal or animals from a vehicle, said means also being employed for guiding the vehicle when necessary.

With these and other objects in view the invention consists of certain other novel constructions, combinations, and arrangement of parts, as will be hereinafter fully described, illustrated in the accompanying drawings, and more particularly pointed out in the claims hereto appended.

In the drawings, Figure 1 is a perspective view of my improved horse-detacher and guiding means for the vehicle, the same being shown connected to a vehicle of any suitable type. Fig. 2 is a fragmentary view, in side elevation, of the structure shown in Fig. 1. Fig. 3 is a fragmentary longitudinal sectional view of the tongue, showing the jointed connection thereof. Fig. 4 is a top plan view of a portion of the doubletree and one of the swingletrees, the end of the doubletree and the central portion being shown in horizontal section for illustrating the supporting and securing means when in its normal position for securing the swingletree to the doubletree. Fig. 5 is a sectional view taken on line 5 5, Fig. 4. Fig. 6 is a longitudinal sectional view of the casing supporting the manually-operated means for actuating the detaching mechanism as well as guiding the vehicle by which said casing is carried.

Referring to the drawings by numerals, 1 designates the body of a vehicle of any suitable type, which is mounted upon a running-gear having a front axle 2 and a reach 3 connecting the front and rear axles. A vertical member 4, as well as the fifth-wheel 5, is positioned upon the front axle 2. The tongue 6 is provided with a stub-tongue or detachable front section 7, and, if it is desired, also removably mounted upon the tongue 6 is a doubletree 8. The doubletree 8 is provided with swingletrees 9 and 10. Each of the swingletrees comprises two sections A and B.

A casing 11 is employed for supporting the grip member 12 thereon by means of approximately parallel links 13, which are movably connected to said member 12, as well as to the collar 18, which is revolubly secured between annular extensions 17 and 19 of casing 11. The spring 16 is secured to the collar 18 and engages the grip member 12 when the same is in its normal position with hook 15, which projects from casing 11. The spring 16 will prevent the member 12 becoming disengaged from hook 15 by jarring or any movement of the vehicle to which the casing 11 may be secured. A vertically-adjustable shaft 14 is pivotally connected to crank member 12, constituting the grip member, said shaft member provided with a screw-threaded surface 20 for the purpose of actuating the pinion 21, which meshes with said portion 20 of the shaft 14. The pinion 21 is secured to horizontal shaft 22 for the purpose hereinafter specified. The casing 11 is provided with arms or supporting extensions 24, which are preferably secured to the running-gear of a vehicle for affording means for securing the casing 11 in a proper position upon the vehicle. Upon the lower end of shaft 14 is a beveled gear 23, which is normally retained out of engagement with the beveled surface 25 of the integral extended portion of the wheel 5. The object of the surface 25 and the beveled gear 23 is to furnish guiding means for controlling the vehicle after the horses have been detached therefrom. The pinion 23 is caused to mesh with the beveled surface 25 by the operator releasing the grip member 12 from engagement with the hook 15 and then drawing upwardly on the same, which will synchronously impart movement to the pinion 21. After the handle of grip member 12 has been positioned so that the comparatively long grip portion thereof lies in approximately a horizontal plane the member 12 may be moved so as to place the same over the dash of the vehicle for permitting of the steering of the same. When the grip member 12 has been so positioned, the beveled gear 23 will be meshing with surface 25. Upon swinging grip member 12 either to right or left movement will be imparted to the front axle 2. The longitudinal adjustment of the grip member 12 can be accomplished by reason of the fact that it is pivotally mounted upon casing 11. After the horses have been detached by employing the mechanism hereinafter described it is desirable to support the stub of the tongue. The brace or support 26 is semicircular in shape and passes under the center brace or reach 3 of the running-gear, and the ends pass forward over the top of the front axle 2 and under the bifurcated ends of the tongue, which are secured to the axle 2. The ends of the brace 26 are positioned at such a distance below the connecting ends of the tongue that they will not interfere with the tongue resting on the ground when in its normal condition, but will prevent the stub from dropping to the ground when the tongue is broken apart at its jointed connection.

An apertured extension 22ª is secured to tongue 6. A section of shaft 22 is journaled in the apertured portion of extension 22ª and a beveled gear 30 is secured thereto. The universal joints 28 and 29 connect telescoping section 27 of shaft 22 and the section carrying beveled gear 30. It will be seen upon considering the drawings, Fig. 1, that the squared member 27ª of section 27 is positioned within the other member of said section. A horizontal beveled gear 31 is secured to a shaft which is provided with right-angled extensions 32 and 33, said shaft being journaled in the tongue 6. The gear 31 meshes with the gear 30. Pivotally secured to the lower extension 33 of said shaft is a plunger 34, which is adapted to be positioned within the apertured portion of the stud or plate 35. Surrounding tongue 6 is a sleeve 36. As heretofore stated, the tongue 6 is sectional in structure. The sleeve 36 is employed for assisting in securing the section 7 of the tongue in an assembled position. For this reason the sleeve 36 is positioned upon the tongue so as to provide a socket 37, into which the inner end of the section 7 may be positioned. The sleeve 36 is provided with a flat base portion upon each edge of which is formed upwardly-extending studs 38, which are positioned within similarly-constructed recesses formed in section 7 when said section is in the position shown in Fig. 2. An approximately central stud or pointed projection 39 is also secured to the base portion of sleeve 36 near the extensions or studs 38. A recess 40 is formed upon the bottom of section 7 for receiving the pointed extension 39 when the tongue 7 is in its assembled position with the other parts.

A link 41 is secured to the upper extension 32 of the shaft carrying beveled gear 31, said link 41 being connected to link 42. The link 42 is secured to bell-crank levers 43, journaled in the laterally-extending supports 44 of the doubletree 8. The levers 43 are pivotally connected to the plunger members 45. The members 45 are adapted to be positioned within the eye 46 of each of the swingletree-connecting links 47. As the supporting and detaching means carried by each end of the doubletree 8 for each of the swingletrees are duplicates, it is only necessary to specifically describe one of said structures. In Fig. 4 I have illustrated the right end of doubletree 8 and the swingletree 10, supported thereon. The transverse section of the doubletree and swingletree shown in Fig. 5 is taken on line 5 5 of Fig. 4. A plate 50, preferably U-shaped, is secured upon the doubletree 8. The plate 50 is provided with an aperture 50ª, which is of sufficient size to permit the eye 46 of sectional link 47 to pass therethrough. Link 47 comprises two sections pivotally connected. A longitudinal aperture 53 is formed in the doubletree 8 for permitting of movement therein of member 47. The swingletree 10 is constructed of two parts A and B. Two members 48 and 49, forming a clamp, partially surround the inner ends of sections A B of swingletree 10 when said swingletree is in its normal position. The member 48 is provided with extensions 51 and 52, fitting into apertured portions of approximately U-shaped member 50. The primary member 48 is provided with shoulders or pins 54 and 55, which are positioned within the body portion of the sections A B for assisting in securing the sections in an assembled position, as is clearly shown in Fig. 4. The swingletree-engaging surfaces of members 48 and 49 are curved, so as to nearly surround the entire body of the sections when the member 10 is in its assembled position with the tongue and the vehicle. When the plunger 45 is withdrawn from the eye 46 of the sectional link 47, the member 47 will be permitted to slide longitudinally within the aperture 53 of the doubletree 8, thereby permitting the auxiliary clamping member 49 to be moved outwardly if the horse is drawing upon the swingletree 10. If the clamping member 49 is moved outwardly, of course said member will be moved away from the pivotally-mounted clamping member 48, thereby permitting of the sections A B to be removed from between the clamp which comprises members 47, 48, and 49.

If it is desired to detach the horses from the vehicle, the shaft 14 may be moved downwardly by means of the grip member 12, as hereinbefore described, causing rotary movement of shaft 22, which will impart similar movement to pinion 30 and pinion 31. The shaft to which pinion 31 is secured will also be revolved, causing movement to be synchronously imparted to plunger 34, as well as plungers 45, through the medium of the connecting levers and links. Upon the withdrawal of the plunger 34 from the apertured stud 35 the section 7 of the tongue will be separated therefrom, and synchronously the links 47 will permit of the front members 49 of the clamps to be moved away from members 48, and consequently the sections A B will be removed from between said members and the horses detached from the vehicle. After the horses have been detached the movement of the vehicle can be controlled by means of the guiding device hereinbefore described.

While I have described in the foregoing description and illustrated in the accompanying drawings the preferred form of my invention, it will be obvious to one versed in the art to which this invention relates that certain alterations, modifications, and changes may be made, and I therefore reserve the right to make such alterations, modifications, and changes as shall fairly fall within the spirit and scope of the present invention.

Having thus fully described my invention, what I claim as new, and desire to secure by Letters Patent, is—

1. In a mechanism of the class described, the combination with a vehicle, of a sectional tongue secured thereto, said sectional tongue provided with a sleeve positioned upon the engaging ends of the sections, locking means for positively securing the engaging ends of said sections within said sleeve, a doubletree carried by said tongue, swingletrees carried by said doubletree, clamping means carried by said doubletree and engaging said swingletrees each of said swingletrees comprising sections, means for permitting of synchronous movement of said clamping means, and locking means for permitting of the separation of the sections of said tongue and the swingletrees.

2. In a mechanism of the class described, the combination with a vehicle and a sectional tongue, locking means for securing the sections of said tongue together, a doubletree carried by said tongue, sectional swingletrees carried by said doubletree, separable clamping means for securing said sections of each swingletree together, and guiding means for and supported upon said vehicle for controlling movement of said locking and clamping means, permitting of the separation of the sections of said tongue and the swingletrees.

3. The combination with a vehicle and a sectional tongue, of guiding means for said vehicle, a doubletree positioned upon said tongue, sectional swingletrees carried by said doubletree, separable clamping means carried by said doubletree for each of said swingletrees, means connecting said clamping means and guiding means, and locking means for securing the sections of said tongue together, being connected to and operable by said guiding means.

4. In a mechanism of the class described, the combination with a vehicle, a sectional tongue secured thereto, a doubletree carried by said tongue, sectional swingletrees carried by said doubletree, of guiding means carried by said vehicle, locking means for securing the sections of said swingletrees and the tongue in an assembled position, and lever and slidable means coacting with said locking means and operable by, and connected to the guiding means.

5. In a mechanism of the character described, the combination with a vehicle and a tongue, a doubletree carried by said tongue, of a sectional swingletree carried by said doubletree, clamping means for said swingletree, guiding means carried by said vehicle and connected to said clamping means and capable of controlling movement of the same.

6. In a mechanism of the class described, the combination with a vehicle, a tongue secured thereto, a doubletree carried by said tongue, clamping means carried by said doubletree, a sectional swingletree carried by said clamping means, said clamping means comprising a pivotally-mounted clamp, comprising two members, one of said members capable of being separated from the other member, and means for controlling movement of said clamp.

7. In a mechanism of the class described, the combination with a vehicle and a sectional tongue, a doubletree carried by said tongue, of a sectional swingletree carried by said doubletree, clamping means for securing the sections of said swingletree together, locking means for securing the sections of the tongue together, guiding means connected to said locking and clamping means and capable of synchronously actuating the same.

8. In a mechanism of the class described, the combination with a vehicle, a sectional tongue carried thereby, a doubletree carried by said tongue, of clamping means carried by said doubletree, said clamping means comprising two pivotally-mounted members, one of said members capable of being separated from the other, a sectional, swingletree positioned between each of said clamping means, means for holding the members of each of the clamping means together, means for locking the sections of said tongue together, and slidable, lever, and revoluble means connecting said clamping and locking means and guiding means.

9. In a mechanism of the class described, the combination with a support, of pivotally-mounted clamping means carried by said support, said clamping means carried by a primary member provided with pins, a horizontal, movable member coacting with said primary member, a sectional, swingletree positioned between said members, and means for securing said members in a fixed position upon said swingletree.

10. In a mechanism of the class described, the combination with a support, of clamping means pivotally mounted upon said support, said clamping means comprising a primary member provided with a pin, an auxiliary member coacting with said primary member, means for drawing said auxiliary member toward said primary member, a swingletree positioned between said primary and auxiliary members, and slidable means for retaining said auxiliary and primary members in a fixed position.

11. In a mechanism of the class described, the combination with a running-gear, of a tubular member carried by said running-gear, a slidable member positioned within said tubular member, means for sliding and rotating said slidable member, a beveled gear member secured to an axle of said running-gear, a beveled gear secured to said slidable member, said beveled gear adapted to engage said beveled member when said slidable member is moved to its lowermost position, a tongue connected to said running-gear, a doubletree carried by said tongue, clamping means carried by said doubletree near each end, a swingletree supported by each of said clamping means, said clamping means comprising primary and auxiliary members, said auxiliary member capable of being adjusted relative to said primary member, and slidable means connecting said clamping means and slidable member positioned within the tubular member.

12. In a mechanism of the class described, the combination with a support, of clamping means carried by said support, sectional swingletrees engaging said clamping means, and guiding means coacting with said clamping means and capable of permitting of the same to be operated for releasing said swingletrees.

In testimony whereof I affix my signature in presence of two witnesses.

CHARLES E. EPPLER.

Witnesses:
    CARLE WHITEHEAD,
    GEORGE S. CLASON.